INVENTOR
RALPH C. IMMEL
BY Alexander & Dowell
ATTORNEYS

United States Patent Office 3,183,939
Patented May 18, 1965

3,183,939
VALVED BRIDGING PLUG AND METHOD
Ralph C. Immel, 5530 Palomar Lane, Dallas, Tex.
Original application Nov. 25, 1960, Ser. No. 71,628, now Patent No. 3,114,395, dated Dec. 17, 1963. Divided and this application Apr. 19, 1963, Ser. No. 277,976
2 Claims. (Cl. 138—97)

This application is a divisional application based on parent application Serial No. 71,628, filed November 25, 1960, now Patent No. 3,144,395.

My invention relates to the art of repairing leaking sections of pipe lines without taking the pipelines out of service, and more particularly relates to an improved method and apparatus for repairing the pipeline by replacing a damaged portion thereof.

It is a principal object of my invention to provide an improved method and apparatus for internally bridging a fault in a pipe line between two stations in the line whereby the faulty portion of the line can be cut out and replaced without disrupting flow of fluid in the line or substantial loss of fluid.

Another important object of my invention is to provide adequate line sealing and leak bridging means which seal the line, when a portion thereof has been cut away, so tightly that it is safe to weld the new portion of the line in place even though the line is carrying a combustible fluid.

Still a further object of the invention is to provide a structure which stops a line-bridging plug in the position necessary to close the leak and which can be manipulated from outside the line at a position adjacent to the repaired portion to permit the plug to move on past the repaired portion to be removed from the line at the next station thereof.

Other objects and advantages of the invention will become apparent during the following discussion of the drawing, wherein.

Figure 1:
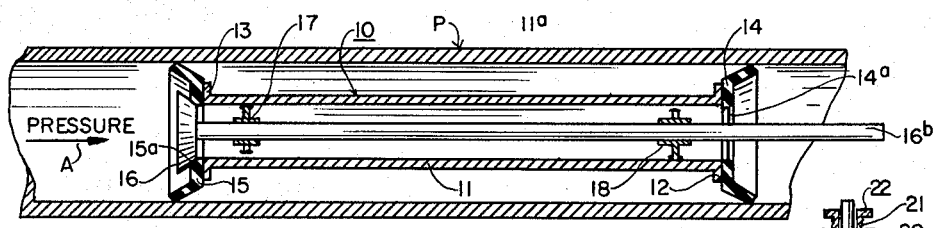
FIG. 1 is a sectional view through a pipe line illustrating a valved leak-bridging plug according to the invention and being propelled to the right by fluid pressure within the line.

Referring now to the drawing, FIG. 1 shows a section of pipe line P filled with a fluid which is pressurized and flowing in the direction of the arrow A. Within the pipe line P is a valved bridging plug 10 according to the invention, the plug comprising a central tubing section 11 having flanges 12 and 13 respectively located at its two ends. These flanges support and are bonded to resilient cups 14 and 15, the actual joint between the flanges and the cups being made in any satisfactory manner, there being a number of adequate joint structures disclosed in the prior art. These cups 14 and 15 are preferably made of a rubber-type material such as neoprene which is resistant to deterioration in the presence of petroleum base fluids.

Each of the cups has an opening therethrough registering with the bore 11a of the tubing 11, these openings 14a and 15a being chamfered to provide a valve seat capable of cooperating with the chamfered surface 16a of a valve 16 having an elongated stem 16b which passes through the bore 11a of the tubing and extends beyond the rubber cup at the other end of the bridging plug 10, the valve stem 16b being centered in the tubing bore 11a by several spacer bushings 17 and 18.

An additional structure comprising a boss 20 welded to the pipe P and a rod 25 extending therethrough into the pipe P is necessary to open the valve 16 when the bridging plug 10 arrives at the leak in the pipe line P just beyond the leak L and then a hole H is drilled through the pipe line and aligned with the axial bore of the boss which comprises the stationary portion of a packing gland which is threaded at 21. A packing nut 22 is screwed into the threaded boss and compresses packing material M around the rod 25 to render the joint leakproof, the rod 25 serving as a manipulating means for the valve 16.

The pressure in the pipe line P drives the bridging plug 10 in the direction of the arrow A while the valve 16 is seated on the seat 15a, FIG. 1, until the valve stem 16b strikes the rod 25 and arrests the forward motion of the valve 16. Inertia and/or fluid pressure carries the plug 10 further to the right until the seat 15a moves far enough beyond the valve surface 16a that the bore through the tubing 11 is opened sufficiently to by-pass the pressure differential which was propelling the plug through the pipe. Then the plug 10 stops in the position shown in FIG. 2.

Figure 2:
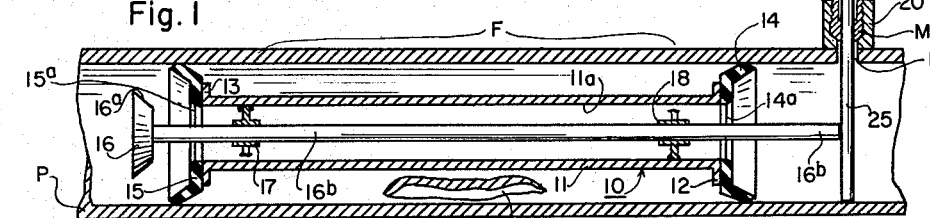
FIG. 2 is a sectional view similar to FIG. 1 but showing the bridging plug stopped in a position which bridges a leak in the line, the valve in the plug having been opened to stop the plug by by-passing the fluid pressure.
Figure 3:
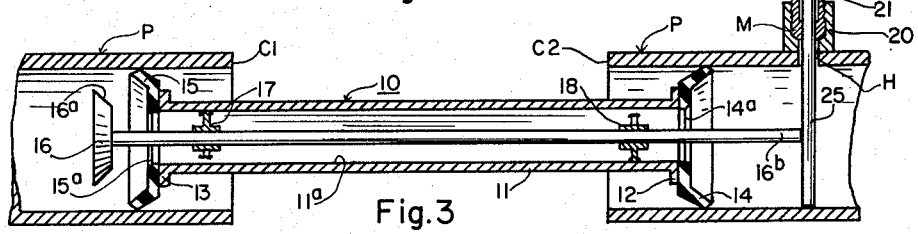
FIG. 3 is a sectional view similar to FIG. 2 but showing the pipe line after the faulty portion thereof has been cut away.
Figure 4:
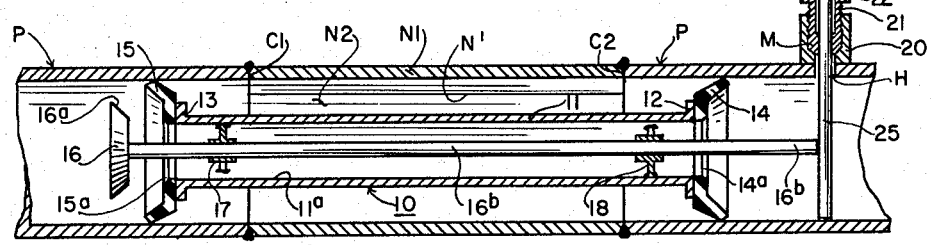
FIG. 4 is a sectional view similar to FIG. 3 but showing a new section of pipe installed to replace the leaking portion which was cut away.

Next, the faulty portion F of the pipe line including the leak L, FIG. 2, is cut away as shown in FIG. 3 along the lines C1 and C2, and a new portion of pipe is inserted and welded in place. For practical reasons the new pipe section will have to be divided longitudinally, for instance along the line N', FIG. 4, and inserted in at least two pieces N1 and N2 and then welded together.

After this step is completed, the rod 25 can be retracted out of the pipe line P, thereby releasing the valve stem 16b and permitting the valve 16 to close. The pressure in the pipe line P will then propel the bridging plug 10 down the pipe line P, as shown in FIG. 1, until it reaches the next station of the pipe line where it can be readily removed in a manner well known per se.

Figure 5:
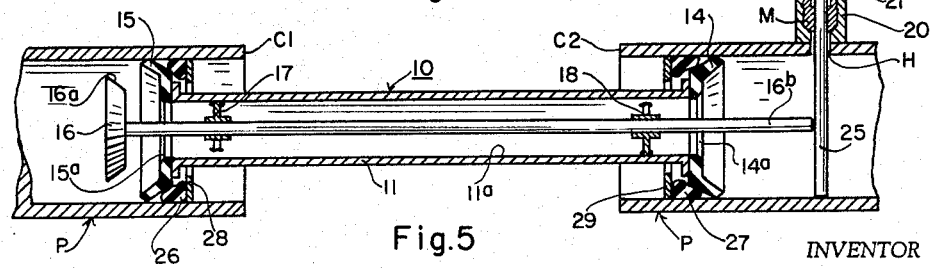
FIG. 5 is a sectional view of the pipe line similar to FIG. 3 but showing additional O-ring sealing means backing up the rubber cup members on the bridging plug and held in place by abutments welded in the pipe line.

Referring to FIG. 5, if an especially secure seal is desired, especially where the bridging plug is to be left in the pipe line P for some time before a new portion N1–N2 is welded in place, O-rings 26 and 27 can be inserted, preferably around the tubing 11 of the bridging plug before it is sent into the pipe line P, and these O-rings can be retained in place by insert rings 28 and 29 secured in place by any suitable means, such as by welding.

I do not limit my invention to the exact forms illustrated in the drawing, for obviously changes can be made in the details of the structure within the scope of the following claims.

I claim:
1. The method of repairing a pipeline carrying fluid under pressure by replacing a faulty portion thereof without interruption of fluid flow, comprising the steps of introducing a plug having a closed bore therethrough into the pipe line; pumping the plug to a position where the plug spans said faulty portion; opening said bore through the plug to maintain fluid flow therepast; cutting away the faulty portion; installing a new portion of pipeline; reclosing said bore; and pumping the plug beyond the repaired portion to a place of convenient removal.

2. The method of repairing a pipeline carrying fluid under pressure by replacing a faulty portion thereof without interruption of fluid flow, comprising the steps of introducing into the pipeline plug means having a bore therethrough and having a valve normally closing the bore; introducing valve manipulating means in the pipeline beyond the faulty portion for opening said valve when contacted by the plug means; pumping the plug means to a position where it spans said faulty portion and abuts the manipulating means, thereby opening said valve to maintain fluid flow through the bore; removing the faulty portion of pipeline; substituting a new portion; removing said manipulating means to reclose the valve; pumping the plug beyond the repaired portion; and removing it from the pipeline.

References Cited by the Examiner

UNITED STATES PATENTS

| | | | |
|---|---|---|---|
| 1,471,184 | 10/23 | Miles | 138—97 |
| 2,171,576 | 9/39 | Larry et al. | 137—15 |
| 2,276,443 | 3/42 | Wilson | 137—15 |
| 2,500,601 | 3/50 | Butler | 138—97 |
| 2,731,041 | 1/56 | Mueller et al. | 138—97 |

LEWIS J. LENNY, *Primary Examiner.*